United States Patent [19]
Haataja

[11] Patent Number: 6,137,836
[45] Date of Patent: Oct. 24, 2000

[54] COMMUNICATION OF PICTORIAL DATA BY ENCODED PRIMITIVE COMPONENT PICTURES

[75] Inventor: Tero Haataja, Tampere, Finland

[73] Assignee: Nokia Mobile Phones Limited, Espoo, Finland

[21] Appl. No.: 08/864,175

[22] Filed: May 28, 1997

[51] Int. Cl.$^7$ ................................................ H04N 7/24
[52] U.S. Cl. .......................... 375/240.08; 348/384.1; 382/243
[58] Field of Search ........................... 348/384, 390; 382/232, 241, 243; 375/240, 240.01, 240.08, 240.09

[56] References Cited

U.S. PATENT DOCUMENTS

| | | | |
|---|---|---|---|
| 3,816,719 | 6/1974 | Trotel | 382/243 |
| 4,748,675 | 5/1988 | Suzuki | 382/147 |
| 5,136,664 | 8/1992 | Bersack | 382/49 |
| 5,295,201 | 3/1994 | Yokohama | 382/236 |
| 5,426,426 | 6/1995 | Hymel | 340/822.55 |
| 5,515,453 | 5/1996 | Hennessey | 382/141 |
| 5,818,966 | 10/1998 | Prasad | 382/232 |
| 5,905,502 | 4/1999 | Deering | 382/242 |

*Primary Examiner*—Bryan Tung
*Attorney, Agent, or Firm*—Perman & Green, LLP

[57] ABSTRACT

A method of transmitting pictorial data provides for reduction of required transmission bandwidth by constructing the pictorial data in the form of a composite image of primitive pictures. Each of the primitive pictures has a simple geometric form such as a line, a circle, a triangle, and a quadrilateral. Each of these primitive pictures is identified by a parameter, which may take the form of an alphanumeric character. Coordinates of a center of a circle, and of end points of a line, and of vertices of a polygon are identified by pairs of parameters giving the X and the Y coordinates of a two-dimensional display of the image. If desired, the image can be constructed as a perspective view of a three-dimensional object, in which case tetrahedrons, spheres, and hexahedrons may be employed. The parameters are converted to digital signals which are transmitted via a communication link to a display for the regeneration of the original image. The image is generated by decoding the digital signal to obtain the set of parameters, and then constructing the image from the set of parameters.

12 Claims, 5 Drawing Sheets

| 7 | 6 | 5 | 4 | 3 | 2 | 1 | 7 | 6 | 5 | 4 | 3 | 2 | 1 |
|---|---|---|---|---|---|---|---|---|---|---|---|---|---|
| * | 2048 | 1024 | 512 | 256 | 128 | 64 | * | 32 | 16 | 8 | 4 | 2 | 1 |

DECIMAL NUMBER '13':

| | | | | | | | 1 | 0 | 0 | 1 | 1 | 0 | 1 |
|---|---|---|---|---|---|---|---|---|---|---|---|---|---|

CHARACTER 'R' (DECIMAL 82):

| 1 | 0 | 0 | 0 | 0 | 0 | 1 | 0 | 0 | 1 | 0 | 0 | 1 | 0 |
|---|---|---|---|---|---|---|---|---|---|---|---|---|---|

CHARACTER 'p' (DECIMAL 112):

| 1 | 0 | 0 | 0 | 0 | 0 | 1 | 0 | 0 | 1 | 0 | 0 | 1 | 0 |
|---|---|---|---|---|---|---|---|---|---|---|---|---|---|

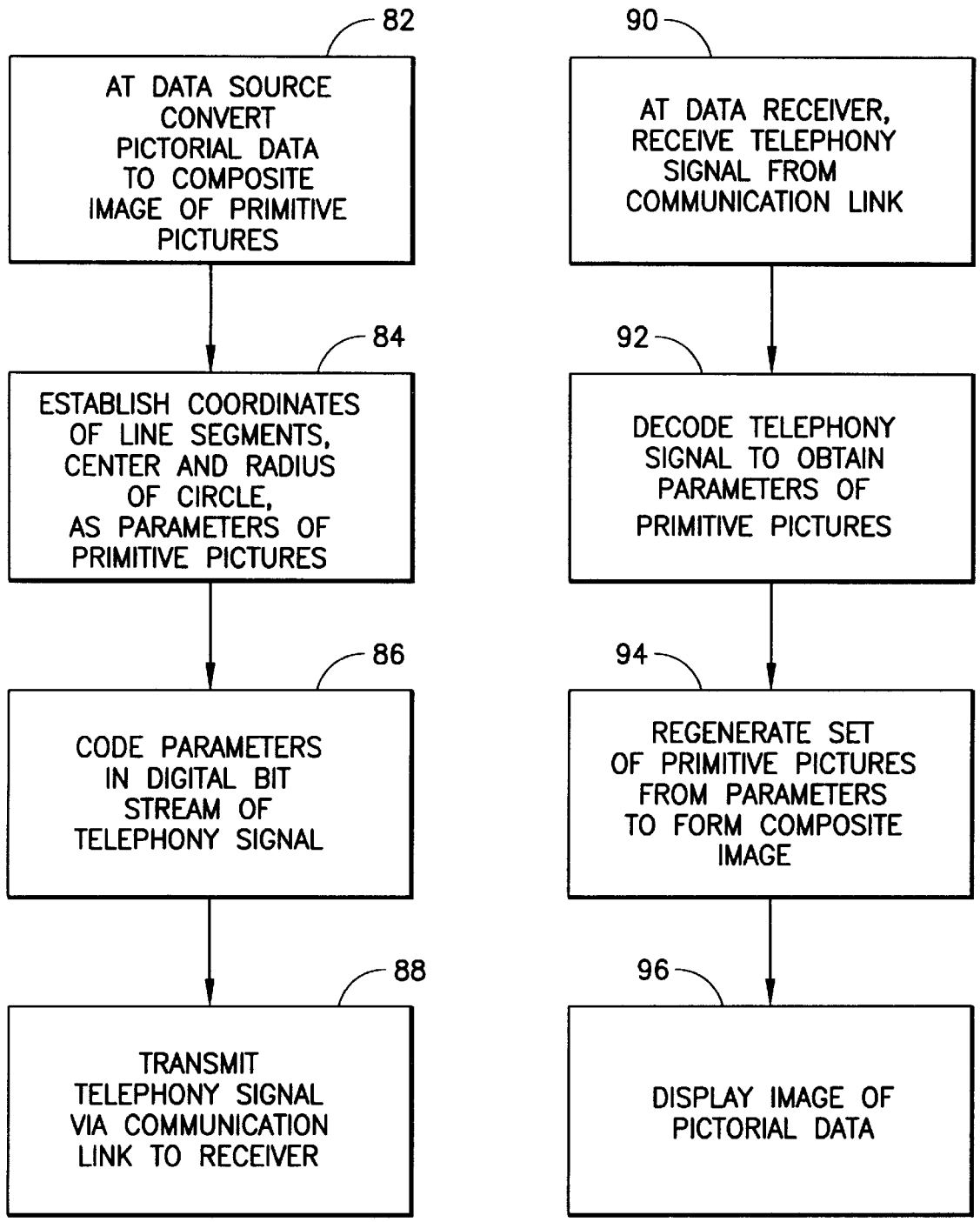

COMMUNICATION OF PICTORIAL DATA BY ENCODED PRIMITIVE COMPONENT PICTURES

BACKGROUND OF THE INVENTION

This invention relates to the communication of pictorial data by a telephony channel having reduced bandwidth such as a paging channel, and, more particularly to the generation of simplified pictures by plural primitive component pictures each of which is characterized by a set of parameters expressible as a sequence of digital bytes.

Various forms of communication channels are in use, the channels varying in their bandwidth in accordance with the data to be transmitted via the channel. For example, in a telephony channel for communication of a paging signal, the allocated bandwidth is significantly smaller than the bandwidth allocated for a telephone channel transmitting normal voice signals. Other communication channels adapted for the concurrent transmission of numerous telephone conversations and/or digital data between computers have still larger bandwidths to accommodate the great amount of data and speed of the data transmission.

It is known that the transmission of pictorial data, such as photographs by way of example, requires the transmission of many data points. Either the data points are to be transmitted slowly over a channel of narrow bandwidth, or the data points can be transmitted rapidly over a channel of larger bandwidth. If one were to transmit normal pictorial data over a channel of substantially reduced bandwidth, such as a paging channel, the pictorial data would take an inordinate amount of time for transmission, such as to render such communication as being impractical in most situations.

It would be useful to be able to communicate pictorial data over a telephony channel of reduced bandwidth, such as a paging channel, because of the considerable convenience offered to parties who need to communicate pictorial data. Small devices for communication at reduced data rates are in use, such as a paging device or Personal Digital Assistant (PDA) or comparable device. One example of such devices is Nokia 9000 Communicator manufactured by Nokia Mobile Phones. Such devices have a display and are small enough to be readily carried about. A portable communication device, such as the PDA, may be capable of one-way or two-way paging, via a communication link such as a GSM (global system for mobile communication) SMS (short message service). By way of example, the PDA may have a large enough display for presentation of a simplified picture and include data input circuitry and circuitry for transmitting information via radio communication. Thus, the PDA may be regarded as being a combination of a portable radiotelephone and a hand-held computer. Facility may be provided for interconnection with both land line telephone networks and cellular telephone networks.

A problem arises in that present communication technology does not enable a user of a portable communication device, such as the PDA, to communicate pictorial data other than the display of possibly a person's name, phone number, and a short message, all of which is presented by way of alphanumeric characters. Diagrams, such as may be used in communicating engineering concepts, or the physical form of an object of interest, cannot be communicated by the common paging channel and presented on the display of a portable communication device.

SUMMARY OF THE INVENTION

The foregoing problem is overcome and other advantages are provided by a telephony system for communication of pictorial data wherein, in accordance with the invention, there is transmission of a simplified picture format composed of geometric components identifiable by relatively few parameters. The geometric pictorial components may be referred to as primitive pictures, each of which is describable in terms of parameters, ranging, typically, in the range of 3–9 parameters This reduces required transmission bandwidths. The parameters can be expressed as a sequence of digital bytes wherein one byte, or two successive bytes, may be employed for transmission of a numeral identifying the parameter. Such a geometric picture component may be transmitted rapidly, even over a paging channel, due to the relatively few symbols required for transmission of the pictorial data.

By way of example, a picture of a house may be composed of a rectangle representing a wall, and wherein a circle within the wall represents a window. A triangle sitting on top of the rectangle represents an attic, and a tall slender rectangle at the side of the attic represents a chimney. Individual numbers of a set of numbers, or alphanumerics, identify the various geometric components or shapes such as a point, a line, a triangle, a circle and a rectangle. Thus, the number serves as a parameter which identifies the primitive picture being transmitted.

Further parameters, in the case of a two-dimensional picture are as follows. A circle is established by a pair of numbers representing the X and the Y coordinates which locate the center of the circle, and a further number which represents the length of the radius of the circle. This provides a total of four characters or numerals by which the circle is constructed and located, namely (1) the numeral identifying the figure as a circle, (2) the numeral representing the X coordinate of the center, (3) the numeral representing the Y coordinate of the center, and (4) the numeral representing the radius.

In similar fashion, a triangle is established by three vertices, each of which is located by two coordinates, an X coordinate and a Y coordinate, and wherein a further alphanumeric character is provided to identify the primitive figure as a triangle. This provides a total of seven parameters, for alphanumeric characters, which must be transmitted to construct the triangle in a specific location on the display of a portable communication device. In the case of a quadrilateral primitive figure, the description of the primitive figure is similar to that of the triangle, except that there is an additional vertex to be located. Thus, the quadrilateral is described by a set of nine parameters. The drawing and locating of a single line is described by a set of four parameters which identify the end points of the line, and a further parameter which identifies the primitive figure as being a line.

A complete simplified picture is a composite image of a plurality of the primitive figures as disclosed above, by way of example, in the construction of the house. In the communication of the simplified picture of the house, in accordance with the invention, there would be first a communication of the rectangle representing the side of the house, this being followed by a communication of the circle representing the window, and in turn, this being followed by a communication of the triangle representing the attic plus a further communication of the elongated rectangle representing the chimney. This order of communicating the primitive pictures is given by way of example, it being understood that the primitive pictures may be communicated in any desired order. A user of the portable communication device would then be able to view the completed simplified figure of the house on his display. By way of example in the use of such a simplified figure, a person may be conversing with a landscape artist and, by use of the simplified figure, be able to identify the locations of various bushes and trees to be installed about the house. Numerous other subjects of communication are available ranging from the description of a medical matter to the configuration of a business enterprise.

BRIEF DESCRIPTION OF THE DRAWING

The aforementioned aspects and other features of the invention are explained in the following description, taken in connection with the accompanying drawing figures wherein:

FIG. 9 is a flow chart showing generation of the composite image of primitive pictures; and FIG. 10 is a block diagram showing reception of the primitive pictures for reconstruction of the composite image.

Identically labeled elements appearing in different ones of the figures refer to the same element but may not be referenced in the description for all figures.

DETAILED DESCRIPTION

Figure 1:
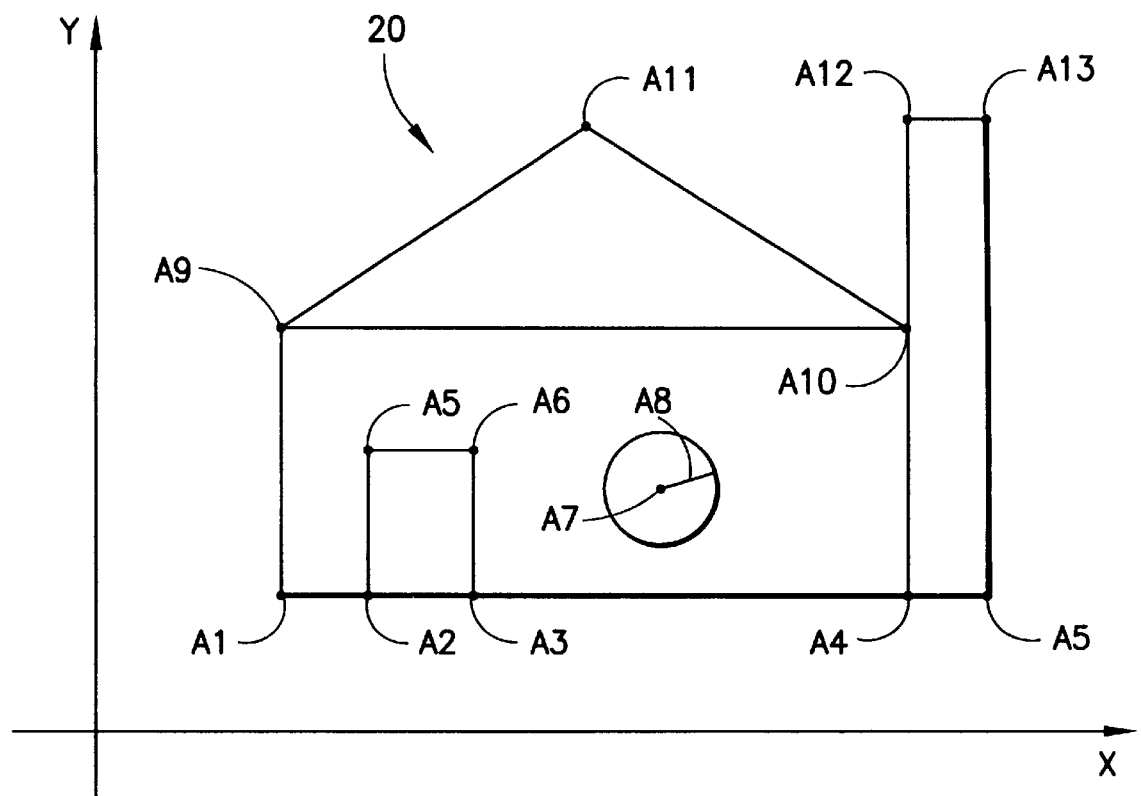
FIG. 1 shows an image of a house constructed of a set of primitive pictures.

FIG. 1 shows a representation of pictorial data by a composite image 20 of a house, the image 20 being composed of a plurality of primitive pictures. A primitive picture may be a line, or a circle, or an object having multiple vertices such as a triangle or quadrilateral, particularly a rectangle. In FIG. 1, the image 20 is presented in a graph of two coordinates, an X coordinate and a Y coordinate. A wall of the house is identified by a rectangle having vertices A1, A4, A9, and A10. A door within the wall is represented by a smaller rectangle identified by the vertices A2, A3, A5, and A6, or, alternatively, may be regarded as being represented by four line segments of which the base of the door is represented by the line segment A2, A3, and the left side of the door is represented by the line segment A2, A5, by way of example. A circular window in the wall is represented by a circle having a radius A8, the circle being centered at a point A7. An attic of the house is represented as a triangle identified by the vertices A9, A10, and A11. A chimney at the side of the house is represented as an elongated rectangle having vertices A4, A5, A12, and A13.

Each of the vertices is understood to have an X coordinate and a Y coordinate which identifies the location of the vertex. Thus, the vertex A1 is to be identified by the coordinates X1 and Y1. The vertex A2 is to be represented by the coordinates X2 and Y2, with corresponding nomenclature of coordinates for the remaining ones of the vertices. Thus, each of the vertices is identified by a pair of numbers, wherein the first number is the X coordinate and the second number is the Y coordinate. The radius A8 of the circle is represented by a single number giving the length of the radius.

Figure 2:
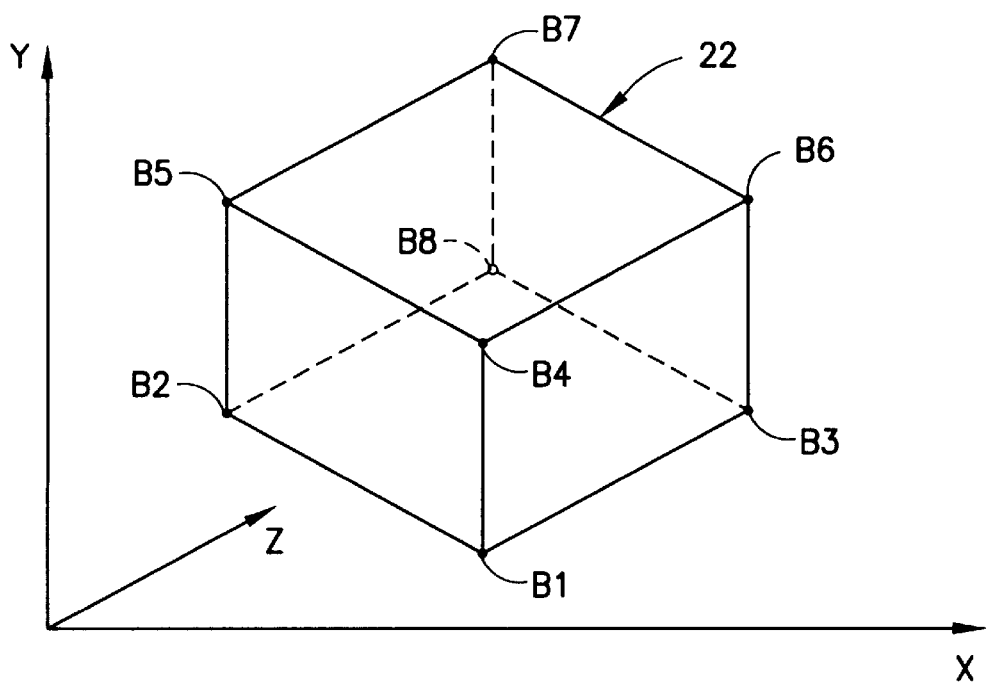
FIG. 2 shows a parallelepiped in a three-dimensional coordinate system.

FIG. 2 shows a primitive picture in the form of a parallelepiped 22 having six sides and eight vertices. The vertices are identified in FIG. 2 by the legends B1, B2 . . . B8. The parallelepiped 22 is shown within a three-dimensional coordinate system having the coordinate axes X, Y, and Z. The presentation of the parallelepiped in FIG. 2 is shown as a two-dimensional representation within the plane of the paper. However, the data shown in FIG. 2 is sufficient for constructing a three-dimensional replica of the parallelepiped 22. Each of the vertices of the parallelepiped 22 is represented by three coordinates. Thus, the vertex B1 is represented by the coordinates X1, Y1, and Z1. The vertex B2 is represented by the coordinates X2, Y2, and Z2, with similar nomenclature being employed for the remainder of the vertices. The primitive picture of FIG. 2, in view of the three-dimensional representation of the primitive picture, can be displayed on the display of a computer operating with a CAD (computer aided design) program which enables rotation of the parallelepiped 22 to a desired orientation.

The foregoing Cartesian coordinate system of X, Y and Z is presented by way of example, it being understood that the invention can be practiced with other forms of coordinate systems, particularly systems of mutually orthogonal coordinates such as cylindrical and spherical coordinate systems.

Figure 3:
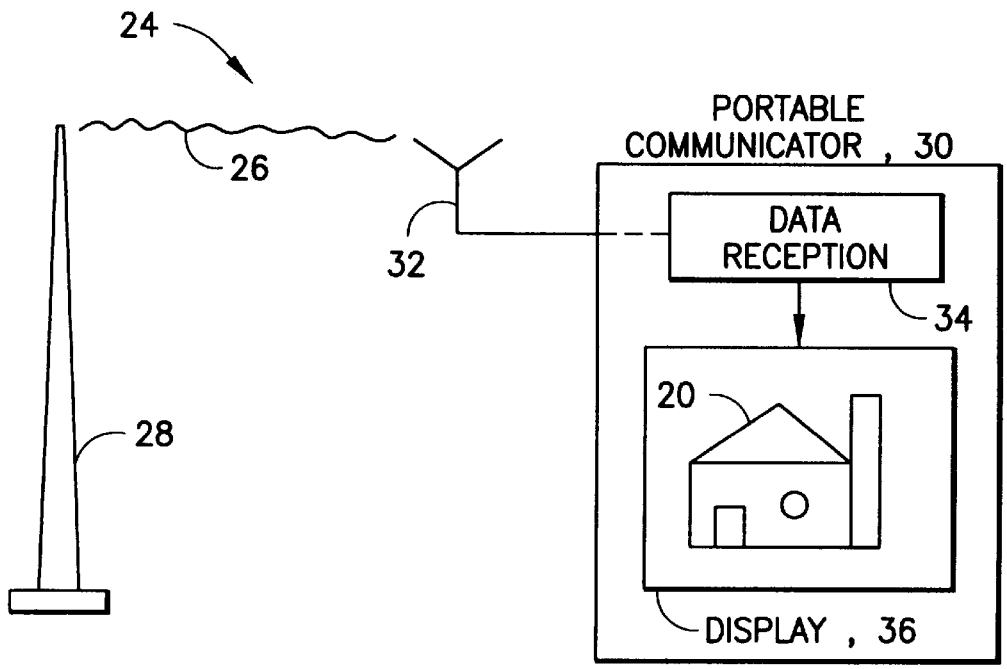
FIG. 3 shows a simplified diagram of transmission of pictorial data to a portable communicator.

FIG. 3 shows a simplified view of a communication system 24 in which a communication link 26 connects between a remote station 28 and a portable communicator 30 such as the aforementioned PDA. The portable communicator 30 includes an antenna 32 for receiving telephony signals transmitted via the link 26, the antenna 32 being connected to a data reception unit 34 of a communicator 30. The communicator 30 includes a display 36 for presentation of an image, such as the two-dimensional image 20 of the house of FIG. 1, or the primitive picture of the parallelepiped 22 of FIG. 2. The data reception unit 34 is understood to include electronic circuitry for decoding the received telephony signal, and for driving the display to show the pictorial data. By way of example, the display 36 is shown as presenting the image 20 of the house of FIG. 1.

Figure 4:
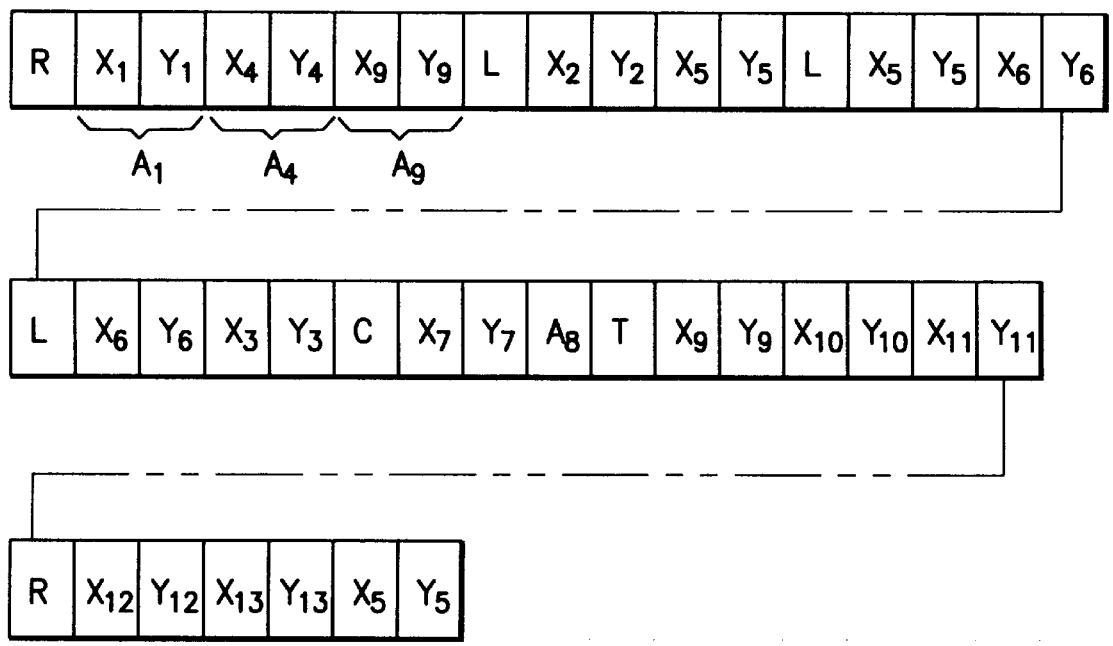
FIG. 4 shows a mode of coding parameters for construction of the composite image of FIG. 1.

FIG. 4 shows an encoding of the image 20 of FIG. 1 by a series of parameters which, in accordance with the invention, include an alphanumeric symbol which identifies the primitive picture, the symbol being followed by sequentially, the pairs of coordinate axes identifying each of a plurality of the vertices of a rectangle and of a triangle, the end points of a line segment, and, in the case of the circle, the coordinates of the center of the circle followed by the length of the radius. By way of example in the selection of primitive pictures, the letter T may be employed for identifying a triangle, the letter Q may be employed for identifying a quadrilateral of possibly uneven sides, with the letter R being employed for the rectangle, and a letter M being employed for a many sided polygon. The circle may be identified by the letter C.

In FIG. 4, the presentation of parameters begins with the letter R indicating that a rectangle is being described. This rectangle is the rectangle having the vertices A1, A4, A9, and A10 in the image 20 of FIG. 1. Since the rectangle is fully determined by means of three of the vertices, there is no need to transmit the fourth vertex A10. If desired, the fourth vertex A10 can be transmitted, however, this constitutes simply a waste of transmission time because the portable communicator 30 (FIG. 3) is able to reconstruct the rectangle from three of the vertices. The string of parameters continues with a description of the door bounded by the vertices A2, A3, A5, and A6 of the image 20 in FIG. 1.

The configuration of the door can be transmitted as a rectangle, in which case the line segment A2, A3 would be repeated since it has already been transmitted as a portion of the line segment A1, A4 of the rectangle representing the side of the house. Since the line segment A2, A3 coincides with the line segment A1, A4, the retransmission of the pictorial data contained in the line segment A2, A3 has no effect upon the reconstruction of the image 20 at the portable communicator 30. Alternatively, if desired, the door can be transmitted as three line segments, namely, the left edge A2, A5 of the door, the top edge A5, A6 of the door and the right side edge A6, A3. By way of example in FIG. 4, the three line segments have been transmitted, accordingly, the letter L appears three times, namely at the beginning of the line A2, A5 at the left edge of the door, as well as for the line segment at the top of the door and the line segment for the right side of the door. In the first line segment, the vertex A2 is represented by the X and Y components thereof, namely X2 and Y2, and the vertex A5 is represented by its coordinate components X5 and Y5. Similar comments apply to the coordinates of the vertices of the top and right side edges of the door.

In the parametric string of FIG. 4, the description of the door is followed by the description of the circular window which begins with the parameter C to identify the figure of a circle, this being followed by the coordinates of the center of the circle X7, Y7, and the length of the radius A8. The description of the image 20 continues with the triangle representing the attic, the triangle being identified by the letter T followed by the X and the Y components of each of the vertices A9, A10, and A11. The description of the image 20 is completed by describing the chimney which, in the primitive picture is represented as an elongated rectangle identified by the letter R in the parametric string. This is followed by a listing of the X and the Y components of three of the vertices, namely the vertices A12, A13, and A5.

In the case of a polygon, such as a polygon having 7, 8, or more sides (not shown) the parameter string would begin with the letter M to indicate that a polygon is being constructed, and then the subsequent listings of coordinates would correspond to the corresponding generations of line segments constituting the perimeter of the polygon. By way of example, one may consider a modification of the image 20 wherein the line A9, A10 is deleted. Then there results an irregularly shaped polygon which can be transmitted by the letter M followed by the coordinates of the vertex A1 followed by the vertex A9 followed by the vertex A11 and continuing with the vertices A10, A4, and then back to vertex A1.

Figures 5, 6, 7:
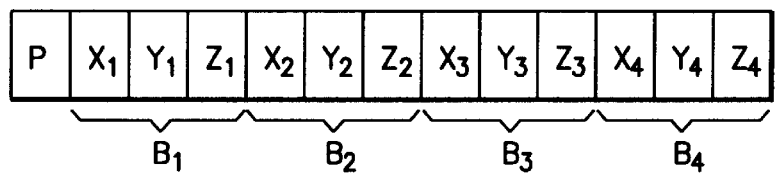
FIGS. 5 and 6 show a digital representation of a parameter.
FIG. 7 shows an encoding of the parallelepiped of FIG. 2

FIG. 5 shows two bytes being transmitted sequentially one immediately after the other. The bits of each byte are numbered 1–7. The seventh bit is used as a check bit to inform the electrical circuitry that, if the next sequence of 6 bits belongs to the previous sequence, then the check bit is to be set to zero. Otherwise, wherein each sequence of six bits is independent of the other sequence of six bits, the check bit is set to one. In this way, if alphanumeric characters are drawn from a set of characters numbering not more than 32 characters, these characters can be identified by simply one byte. On the other hand, use of two bytes enables one to transmit as many as 2048 different alphanumeric characters and positions on a screen.

FIG. 6 gives an example of this form of digital representation of alphanumeric characters. The first line of FIG. 6 shows the digital representation of the decimal number 13. The second line of FIG. 6 shows a decimal representation for the character R by representing the character R by the decimal value 82. The third line of FIG. 6 shows a representation of the character P by the decimal 112. By using such decimal representation of alphanumeric characters, each of the coordinate values of the respective vertices set forth in the parameter string of FIG. 4 can be represented by a sequence of digital bytes. Also, the letters, such as R, L, C, and T are represented in digital signal format by bytes as shown in FIG. 6. Thereby, a complete description of the image 20 can be transmitted by coding the picture, wherein the primitive pictures are used as coding blocks, and wherein the components of each primitive picture are in turn, encoded in a bit stream. Text can be transmitted, in the same coding format as shown in FIG. 6, by transmitting a sequence of letters which spell a word, and then transmitting a blank space followed by the letters of an additional word.

FIG. 7 demonstrates the transmission of data of the three-dimensional primitive picture of the parallelepiped 22 of FIG. 2. The bit string begins with the letter P to identify the parallelepiped of FIG. 2. This is followed by the three dimensional coordinates of the vertex B1, namely, X1, Y1, and Z1. This, in turn, is followed by a transmission of the three dimensional coordinates of each of the vertices B2 and B3. These three vertices define a rectangular portion of a plane having opposed parallel edges. Then, there is a transmission of the three dimensional coordinates of the vertex B4. This defines the spacing between the top and bottom planar surfaces of the parallelepiped. While the coordinates of the additional vertices could be transmitted if desired, there is no need for the additional vertices since the four vertices are sufficient to fully define the configuration and orientation of the parallelepiped.

Figure 8:
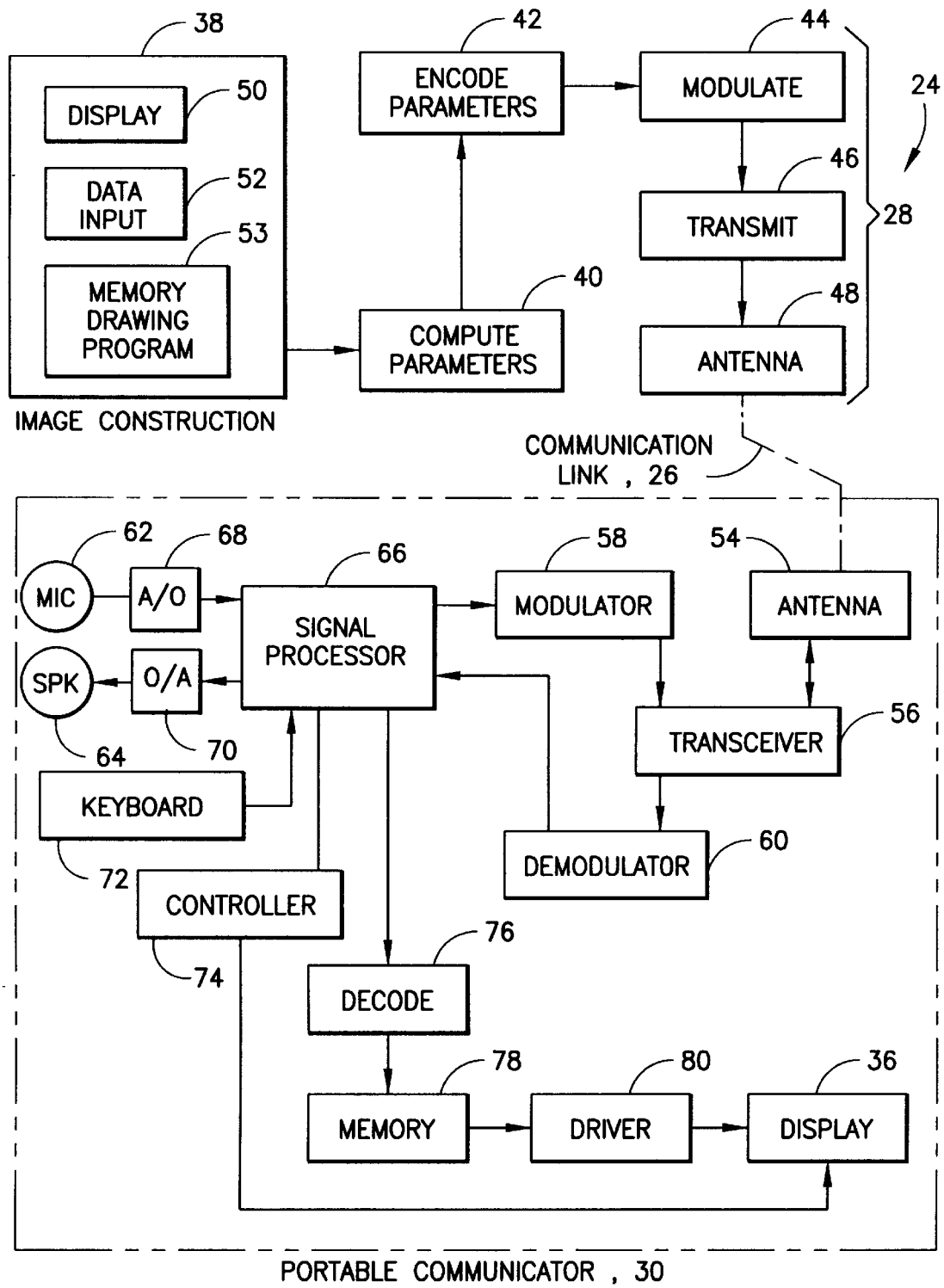
FIG. 8 is a block diagram showing construction of the composite image at a source of pictorial data, and communication of the pictorial data to a portable communicator.

FIG. 8 shows details in construction of the communication system 24 of FIG. 3. In FIG. 8, the remote station 28 includes an image construction unit 38, a computer 40 for computing the values of the parameters, an encoder 42 for encoding the parameters in a digital format, a modulator 44, a transmitter 46 and an antenna 48. The image construction unit 38, by way of example, may be a computer system having a display 50, a data input unit 52 such as a keyboard and mouse, and a memory 53 for storing a drawing application program for operation of the computer system of the image construction unit 38. In the operation of the image construction unit 38, a person employs the keyboard and the mouse of the data input unit 52 to draw a group of primitive pictures which appears on the display 50. The group of primitive pictures collectively constitute an image or likeness of a physical object, by way of example, for which it is desired to communicate pictorial data to a person having the portable communicator 30. The computer 40 may be included within the image construction unit 38 if desired. The computer 40 computes the end points of lines drawn on the display 50 as well as the radius and the coordinates of the center of a circle which may be constructed on the display 50. The computer 40 also identifies the various primitive pictures as being rectangles, triangles, and other geometric forms. The resulting parameters are outputted by the computer 40 to the encoder 42 which encodes the parameters in digital format, such as the digital format taught in FIGS. 4–7. The encoded parameters provided by the encoder 42 are then modulated onto the radio-frequency (RF) carrier by the modulator 44 and transmitted via the transmitter 46 and via the antenna 48 to the communication link 26. By way of example, the communication link 26 may be a cellular telephone link operating via point-to-point communication over land, or via satellite to the portable communicator 30.

The portable communicator 30 may be either a paging device or a cellular telephone modified in accordance with the invention for regenerating the composite image 20 (FIG. 1) and presenting the composite image 20 on the display 36.

A portable communicator, such as the aforementioned PDA is shown, by way of example, in the practice of the invention.

The communicator 30 comprises an antenna 54 and a transceiver 56, the transceiver 56 receiving signals communicated over the link 26 via the antenna 54. The transceiver 56 is capable both of the transmission and the reception of RF signals and, accordingly, is connected to a modulator 58 which provides outgoing signals to the transceiver 56 and to a demodulator 60 which processes incoming signals received by the transceiver 56. For providing the functions of a cellular telephone, the communicator 30 includes a microphone 62 for receiving incoming sonic signals such as voice or music, and a speaker 64 for outputting sonic signals such as voice or music. Also included within the communicator 30 is a digital signal processor 66 which connects to the microphone 62 via an analog-to-digital converter 68, and to the speaker 64 via a digital-to-analog-converter 70. A keyboard 72 is provided for entry of telephone numbers to the signal processor 66 for initiation of telephone calls. A controller 74 controls operation of the communicator 30, particularly operation of the signal processor 66 for initiation and reception of telephone calls, and control of the display 36 to show numbers inputted by the keyboard 72 as well as for presenting a display of pictorial data transmitted from the remote station 28. Also included in the communicator 30 is a decoder 76 for decoding the digitally encoded parameters to obtain the values of the parameters, a memory 78 for storing values of the parameters provided by the decoder 76, and a driver 80 which receives the parameters from the memory 78 and converts the parameter values to drive signals for operating the display 36.

In the operation of the communicator 30 as a cellular telephone, a person employs the keyboard 72 for activating the power for operation of the communicator 30, and for dialing a calling number of a distant telephone. The controller 74 and the signal processor 66 operate, in a well-known fashion, to output control signals via the modulator 58 and the transceiver 56 for initiating communication with the remote station 28 (FIG. 3) via the communication link 26, and for establishing incoming and outgoing channels for two-way communication with a telephone at the remote station 28. The signal processor 66 provides the functions of signal compression and expansion, as well as digitally encoding and decoding the telephony signals, in accordance with established protocol, to provide for the transmission and reception of voice and data telephone signals. The outgoing signals are applied to the modulator 58 which modulates the signals onto a transmission band carrier to be transmitted as outgoing signals via the transceiver 56 and the antenna 54. The demodulator 60 is operative to demodulate received signals from the carrier of the incoming signal channel to obtain a base band coded signal. The coded signal is decoded into the base band signal to be outputted by the speaker 64.

In the case of operation of the communicator 30 for the reception of pictorial data signals, the signal processor 66 recognizes the presence of such signals outputted via the demodulator 60, and applies these digital signals to the decoder 76 for obtaining the picture parameters for presentation of the composite image 20 (FIG. 1). If desired, the communicator 30 can also be adapted for transmission of pictorial data by including within the signal processor circuitry of the computer 40 and the encoder 42 employed in the remote station 28. Thereby, by use of cursor keys on the keyboard 72, a person employing the communicator 30 is able to draw the primitive pictures upon the display 36, and to have the parameters of the primitive pictures outputted via the signal processor 66. The primitive pictures are then applied by the signal processor 66 to the modulator 58 for transmission via the transceiver 56, the antenna 54, and the communication link 26 to a distant location.

FIG. 9 is a flow chart showing the operation of a source of pictorial data, such as the remote station 28 (FIG. 8), in the establishment of the primitive pictures and the associated parameters for transmission to a distant location. At block 82, pictorial data is presented as a composite image of a plurality of primitive pictures. Then, at block 84, the coordinates of the line segments of the various primitive pictures are established, and also the location of the center, and the magnitude of the radius of a circle is established. The values serve as the parameters of the primitive pictures to be employed in regenerating the primitive pictures at a distant location. Then, at block 86, the parameters are encoded in the form of a digital bit stream for transmission via a telephony signal. The telephony signal is transmitted at block 88 via a communication link to a distant receiver.

By way of further example in the use of the invention, in a GSM system, when a short message is sent and the recipient is not available, the message will be stored in the memory means of the SM-SC (short message service center) for a predetermined period of time. The SM-SC will try to locate the recipient and if found, the stored message will be forwarded to the recipient. Therefore, it may take a long time before recipient receives the message. Normally it will take 5 to 10 seconds. This example, therefore, is somewhat different than normal paging, but is still applicable for use of the invention.

In FIG. 10, at block 90, the pictorial data is received from a communication link as a telephony signal at a receiver of a receiving station, which receiving station may be a portable communicator, such as the communicator 30 (FIG. 8). At block 92, the received telephony signal is decoded to obtain the values of the parameters for reconstruction of the primitive pictures. Then, at block 94, the parameters are employed in a regeneration of the set of primitive pictures, the primitive pictures serving to form a composite image of the pictorial data. At block 96, the pictorial data is displayed in the form of the composite image.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A method of communicating pictorial data, the method being suitable for communicating the pictorial data, at least partially, via a reduced-bandwidth communication channel having a bandwidth less than a bandwidth of a voice telephony channel, the method comprising steps of:

representing the pictorial data as a composite image of a set of primitive pictures;

identifying each of said primitive pictures by a set of parameters wherein each of said parameters can be expressed as an alphanumeric character in digital format, said parameters identifying shape, size, and location of a respective one of the primitive pictures for a display region; and communicating said sets of parameters for respective ones of the primitive pictures by said reduced bandwidth communication channel from a first terminal to a second terminal of said channel, said step of communicating including an ordering of the parameters in each parameter set in a predetermined sequence for a coding of respective ones of said sets of parameters, the parameters in a sequence of sets of parameters being transmitted as a string of digits;

wherein, in an individual one of said parameter sets having an identification of the shape of a primitive picture, an alphanumeric character identifies the shape and serves also to designate the number of alphanumeric characters to be employed in establishing the size and the location of the primitive picture, thereby to enable an extracting of parameter sets of respective ones of said primitive pictures from said string of digits upon reception of the pictorial data.

2. A method according to claim 1 wherein said set of primitive pictures includes at least one of a point, a line segment, a circle, a triangle, and a quadrilateral.

3. A method according to claim 1 wherein, in said representing step, there is a step of selecting a parameter identifying a primitive picture of said set of primitive pictures.

4. A method according to claim 3 wherein, in said representing step, there is a step of selecting two parameters representing values of two coordinates which locate a point of a primitive picture in the image.

5. A method according to claim 4 further comprising a step of constructing said image of said set of primitive pictures prior to said communicating step.

6. A method according to claim 5 further comprising a step, subsequent to said constructing step, of encoding each of said set of primitive pictures by a set of digitally formatted parameters.

7. A method according to claim 6 further comprising a step, at said second terminal, of decoding the set of digitally formatted parameters received at said second terminal to obtain the parameters of individual ones of said set of primitive pictures.

8. A method according to claim 7, wherein said communication channel is a paging telephony channel, said first terminal includes a transmitter of the image and said second terminal includes a receiver and means comprising said display and coupled to said receiver for presenting the image, the method further comprising a step of regenerating, at the presenting means, the image from the parameters.

9. A method according to claim 3 wherein, in said representing step, there is a step of selecting three parameters representing values of three orthogonal coordinates which locate a point in three dimensions of a primitive picture in the image to provide a perspective view of a three-dimensional object, said parameters enabling a rotation of said composite image in three dimensions.

10. A communication transmission terminal comprising:

means for composing an image from a set of primitive pictures;

means for representing each primitive picture employed in the composing of said image by a set of parameters, a totality of said parameters for all primitive pictures employed in the composing of said image requiring a smaller transmission bandwidth than a channel bandwidth suitable for transmission of said image;

wherein each of said parameters can be expressed as an alphanumeric character in digital format, said parameters identifying shape, size, and location of each of respective ones of the primitive pictures of the image; and means for transmitting said parameters along a communication channel, the parameters in a sequence of sets of parameters being transmitted as a string of digits, wherein a transmission of said parameters includes parameters of shape, size, and location for each of the primitive pictures of said set, said transmitting means being operative to order the parameters in each parameter set in a predetermined sequence for a coding of parameter sets of respective ones of said primitive pictures;

wherein, in an individual one of said parameter sets having an identification of the shape of a primitive picture, an alphanumeric character identifies the shape and serves also to designate the number of alphanumeric characters to be employed in establishing the size and the location of the primitive picture, thereby to enable an extracting of parameter sets of respective ones of said primitive pictures from said string of digits upon reception of the pictorial data.

11. A communication system suitable for communication of an image comprising:

a communication channel and means for composing an image from a set of primitive pictures;

means for representing each primitive picture employed in the composing of said image by a set of parameters, a totality of said parameters for all primitive pictures employed in the composing of said image requiring a smaller transmission bandwidth than a channel bandwidth suitable for transmission of said image;

wherein each of said parameters can be expressed as an alphanumeric character in digital format, said parameters identifying shape, size, and location of each of respective ones of the primitive pictures of the image;

means for transmitting said parameters along said communication channel, the parameters in a sequence of sets of parameters being transmitted as a string of digits, wherein a transmission of said parameters includes parameters of shape, size, and location for each of the primitive pictures of said set, said transmitting means being operative to order the parameters in each parameter set in a predetermined sequence for a coding of parameter sets of respective ones of said primitive pictures;

means coupled to said communication channel for receiving said parameters, said receiving means being operative to decode the parameter sets;

means for reconstructing individual ones of said primitive pictures of said image from said parameters; and means for generating said image from said primitive pictures;

wherein, in an individual one of said parameter sets having an identification of the shape of a primitive picture, an alphanumeric character identifies the shape and serves also to designate the number of alphanumeric characters to be employed in establishing the size and the location of the primitive picture, thereby to enable an extracting of parameter sets of respective ones of said primitive pictures from said string of digits upon reception of the pictorial data.

12. A system according to claim 11 wherein said representing means includes means for computing parameters of each primitive picture employed in the composing of the image.

* * * * *